United States Patent [19]

Kassai

[11] Patent Number: 4,723,815
[45] Date of Patent: Feb. 9, 1988

[54] BABY CARRIAGE BACKREST INCLINATION ANGLE ADJUSTING MECHANISM

[75] Inventor: Kenzou Kassai, Osaka, Japan

[73] Assignee: Aprica Kassai Kabushikikaisha, Osaka, Japan

[21] Appl. No.: 893,497

[22] Filed: Aug. 5, 1986

[30] Foreign Application Priority Data

Aug. 26, 1985 [JP] Japan ................. 60-187973

[51] Int. Cl.⁴ .............................. B62B 7/06
[52] U.S. Cl. ..................... 297/355; 280/642; 280/658; 280/47.4
[58] Field of Search .......... 280/642, 644, 647, 648, 280/650, 658, 47.4, 47.28; 297/354, 355, 374, 375, 376, 377

[56] References Cited

U.S. PATENT DOCUMENTS

| 683,032 | 9/1901 | Franklin | 297/377 |
| 980,049 | 12/1910 | Beyer | 297/375 |
| 2,795,433 | 4/1954 | Moriarty | 280/47.28 |
| 4,538,830 | 9/1985 | Nakao | 280/647 |

FOREIGN PATENT DOCUMENTS 3008011 9/1981 Fed. Rep. of Germany ..... 280/47.4

2163644 3/1986 United Kingdom ............... 280/648

Primary Examiner—David M. Mitchell
Assistant Examiner—Brian L. Johnson
Attorney, Agent, or Firm—W. G. Fasse; D. H. Kane, Jr.

[57] ABSTRACT

A baby carriage backrest inclination angle adjusting mechanism comprises a backrest support member, a friction member turnable between a first and a second position, turning operating means for operating the friction member for turning movement, and a prop member for supporting the backrest support member from behind. The backrest support member is formed with a projecting wall and an elongated opening extending parallel to the projecting wall. A pin which interconnects the backrest support member and friction member extends through the elongated opening and is movable along the elongated opening. The friction member has a long radius portion located at a relatively long distance from the pin and a short radius portion located at a relatively short distance from the pin. When the friction member is in the first position, the long radius portion abuts against the projecting wall. On the other hand, when the friction member is in the second position, the short radius portion is opposed to the projecting wall with some clearance defined therebetween.

3 Claims, 7 Drawing Figures

FIG. 2
FIG. 3
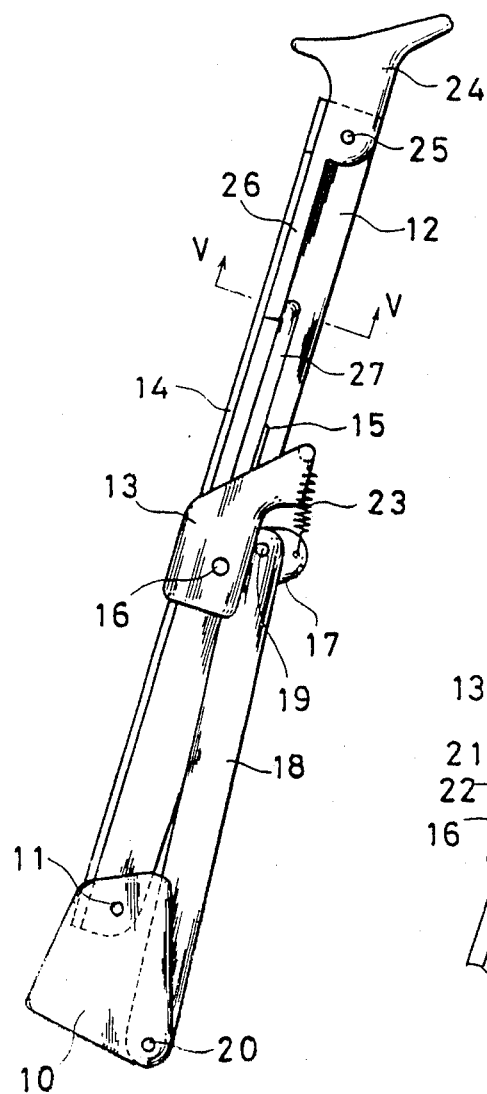
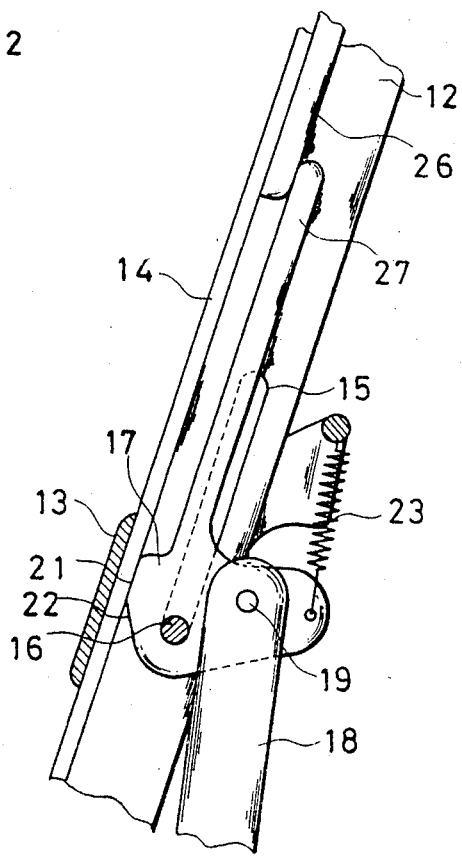

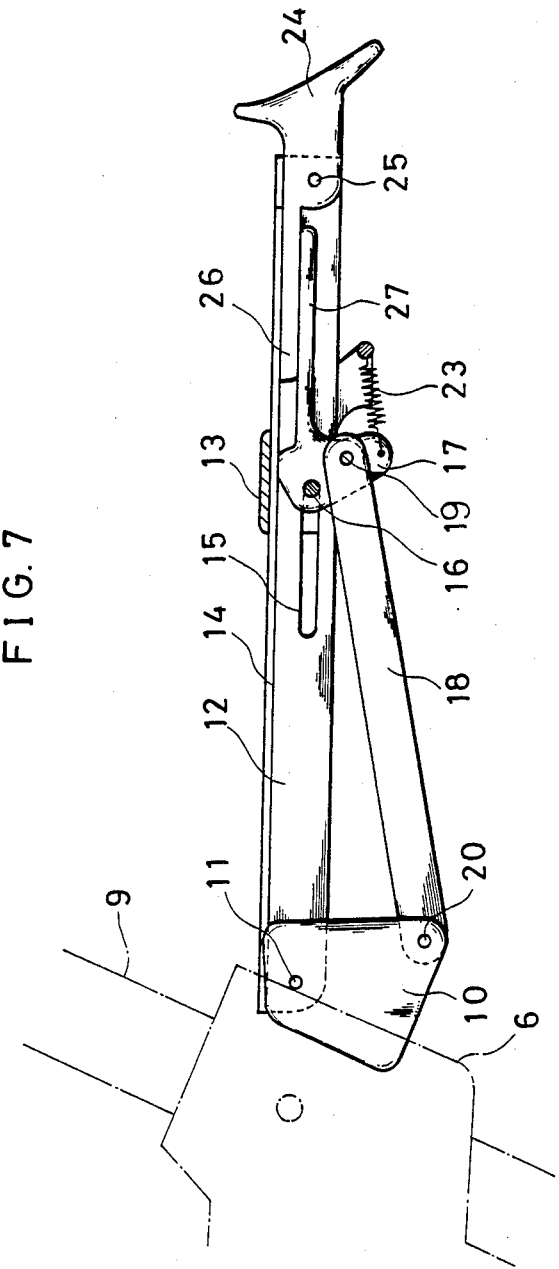

BABY CARRIAGE BACKREST INCLINATION ANGLE ADJUSTING MECHANISM

BACKGROUND OF THE INVENTION

1. Field of the Invention

This invention relates to a baby carriage, particularly to a mechanism for adjusting the angle of inclination of the backrest portion of a baby carriage.

2. Description of the Prior Art

Nowadays, many types of baby carriages with backrest portions adapted for a variable angle of inclination are on the market. In such baby carriages, usually, the angle of inclination of the backrest portion is adjustable in a stepwise manner. That is, the backrest portion is constructed so that it can be fixed at predetermined angles of inclination.

From the standpoint of convenience of use of baby carriages, however, it is desirable that the backrest portion can be fixed at any desired angle of inclination.

SUMMARY OF THE INVENTION

Accordingly, an object of the invention is to provide a baby carriage backrest inclination angle adjusting mechanism for fixing the backrest at any desired angle of inclination.

A baby carriage backrest inclination angle adjusting mechanism according to this invention comprises a backrest support member turnably connected at its lower end to a baby carriage body, a friction member attached to said backrest support member by a pin and adapted for a turning movement between a first and a second position. The turning is performed by operating means for said friction member. A prop member that supports the backrest member from behind. The prop member is turnably connected at its upper end to the friction member. The lower end of the prop member is journalled to the baby carriage body.

The backrest member has a lengthwise extending first wall portion and a second wall portion projecting from the first wall. An elongated opening is located in the first wall portion rearwardly of and extending in parallel to the second projecting wall portion. The pin which connects the backrest support member to the friction member extends through said elongated opening and is movable along and in said elongated opening.

The friction member has a zone facing the second projection wall. This zone is divided into a long radius section located at a relatively long distance from said pin and a short radius section extending downward from said long radius section and located at a relatively short distance from said pin.

When the friction member is in the first position, the long radius section abuts against the projection wall portion. On the other hand, when the friction member is in the second position, the short radius portion is opposed to the projecting wall portion with some clearance defined between the short radius section and the projection wall portion.

The loaded state of the backrest inclination angle adjusting mechanism will now be described. The prop member firmly holds the state of contact between the long radius section of the friction member and the projection wall portion. Thus, a large frictional force is produced between the friction member and the projecting wall portion, with the result that the position of the friction member is fixed. Accordingly, the position of the prop member is fixed and hence the inclined state of the backrest is also fixed.

On the other hand, when the friction member is turned to the second position by the operating means, the short radius section is opposed to the projecting wall portion with some clearance defined therebetween. In other words, the frictional force between the friction member and the projecting wall portion disappears, whereby the friction member and the pin which interconnects the friction member and the backrest support member, are allowed to move along the elongated opening. In response to this movement of the friction member, the angle of inclination of the backrest portion changes. When the backrest portion assumes a desired angle of inclination, the hand is removed from the operating means, whereupon the friction member is turned back to the first position by the action of the prop member. Therefore, the backrest portion is fixed at this desired angle of inclination.

Thus, according to the invention, the backrest portion of the baby carriage can be fixed at any desired angle of inclination.

These objects and other objects, features, aspects and advantages of the present invention will become more apparent from the following detailed description of the present invention when taken in conjunction with the accompanying drawings.

BRIEF DESCRIPTION OF THE DRAWINGS

FIG. 2 is an enlarged view of an arrangement associated with a backrest support member shown in FIG. 1;

FIG. 3 is an enlarged portion which, in FIG. 2, is hidden by a slide member;

FIG. 7 is a view showing the state in which the angle of inclination of the backrest support member is at a maximum.

DESCRIPTION OF THE PREFERRED EMBODIMENTS AND OF THE BEST MODE OF THE INVENTION

Figure 1:
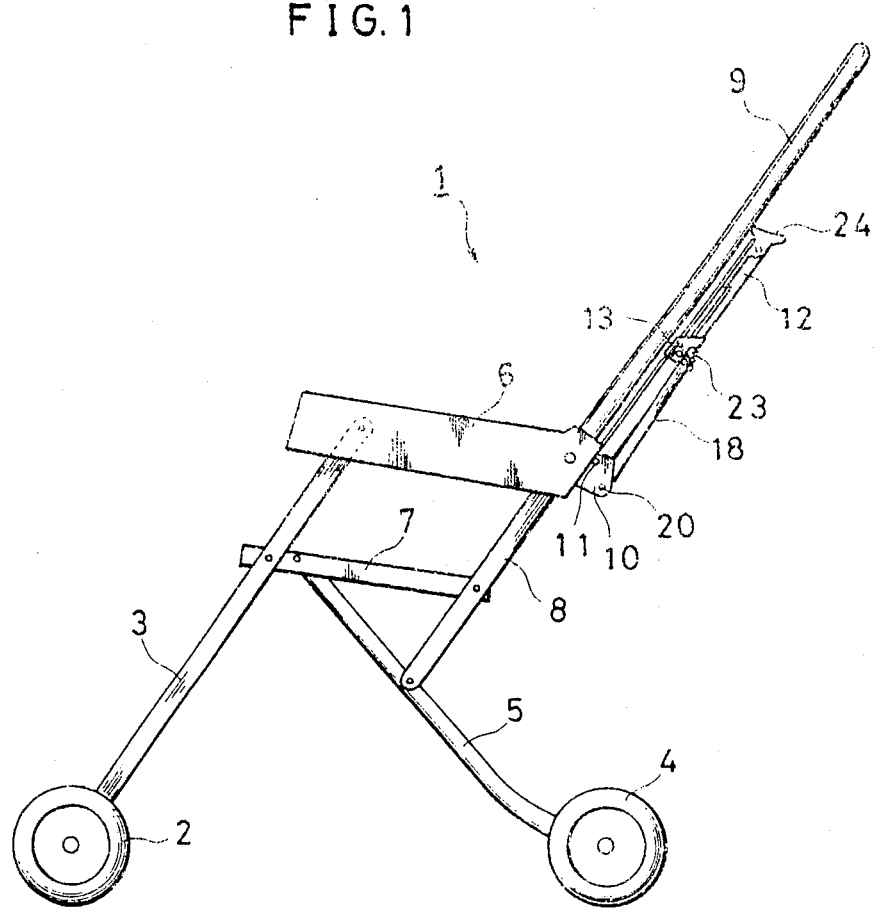
FIG. 1 is a side view of a baby carriage to which an embodiment of the invention is applied.

Referring to FIG. 1, the present baby carriage 1 comprises front legs 3 having front wheels 2, rear legs 5 having rear wheels 4, handrails 6, seat support rods 7 for supporting a seat, and push rods 9 extending upward from the rear ends of the handrails 6. A base member 10 is fixed to the rear end of each handrails 6. A backrest support member 12 for supporting the backrest portion of the baby carriage is turnably connected at its lower end to the base portion 10 by a pin 11.

In FIG. 2, a slide member 13 shaped to surround the backrest support member 12 is shown, but the portion characteristic of the invention is hidden under the slide member 13. In FIG. 3, therefore, the overlying wall of the slide member 13 is removed to show enlarged the portion hidden by the slide member 13.

Referring to FIGS. 2 and 3, the backrest support member 12 has a lengthwise extending first wall portion and a projecting second wall portion 14, and an elongated opening 15 in said first wall portion positioned rearwardly of and extending parallel to said second projecting wall portion 14. A pin 16 extends through said elongated opening 15. The pin 16 is movable along and in said elongated opening 15.

As shown in FIG. 3, a friction member 17 is disposed on the backrest support member 12. The friction member 17 is attached to the pin 16 extending through the elongated opening 15 and is turnable around the axis of said pin 16. The range of turning movement is between the first position shown in FIG. 3 and the second position shown in FIG. 6.

Figure 4:
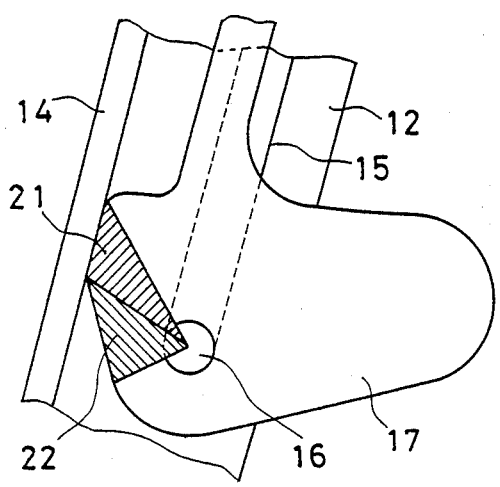
FIG. 4 is an enlarged view of a friction member which, in FIG. 3, is hidden.

FIG. 4 is an enlarged view of the friction member 17 shown in FIG. 3. The friction member 17 has, on its zone opposed to the projection wall 14, a long radius section 21 located at a relatively long distance from said pin 16 and a short radius section 22 extending downwardly from said long radius section 21 and located at a relatively short distance from said pin 16. When the friction member is in the first position shown in FIGS. 3 and 4, the long radius section 21 abuts against the projecting wall 14. On the other hand, when the friction member 17 is in the second position shown in FIG. 6, the short radius section 22 is opposed to the projecting second wall portion 14 with some clearance defined therebetween.

Referring to FIGS. 2 and 3, to support the backrest member 12 from behind, a prop member 18 is disposed rearwardly of the backrest support member 12. This prop member 18 is turnably connected at its upper end to the friction member 17 by a pin 19 and at its lower end is journalled to the base member 10 by a pin 20.

The slide member 13 is fixed to the pin 16 extending through the elongated opening 15 and together with said pin 16 it moves on the backrest support member 12. Further, as shown in FIG. 3, a spring 23 is connected between the slide member 13 and the friction member 17. The spring 23 constantly urges the friction member 17 to turn back to the first position shown in FIG. 3.

Figure 5:
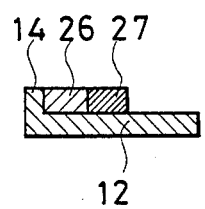
FIG. 5 is a view taken along the line V—V in FIG. 2.

Referring to FIG. 2, turning operating means is provided on the backrest support member 12 for turning or rotating the friction member 17. In this embodiment, a lever 24 is employed as the turning operating means. The lever 24 is turnably connected to the backrest support member 12 by a pin 25. The lever 24 has a leg portion 26 extending substantially downwardly. The friction member 17 has an upward extension 27 extending substantially upwardly. The upward extension 27 and the leg portion 26 of the lever 24 are engaged with each other, as shown in FIG. 5 showing a view taken along the line V—V in FIG. 2. When the friction member 17 is in the first position shown in FIG. 1, the leg portion 26 of the lever 24 is held between the projecting wall 14 of the backrest support member 12 and the upward extension 27 of the friction member 17.

In the state shown in FIGS. 2 and 3, suppose that a rearward load is applied to the backrest support member 12. In that case, the prop member 18 acts to turn the friction member 17 counterclockwise as viewed in FIG. 3. As a result, the state of contact between the long radius section 21 of the friction member 17 and the projecting wall 14 of the backrest support member 12 is firmly maintained and a great frictional force is produced therebetween. Therefore, the position of the friction member 17 is fixed and hence the angle of inclination of the prop member 18 is also fixed.

Figure 6:
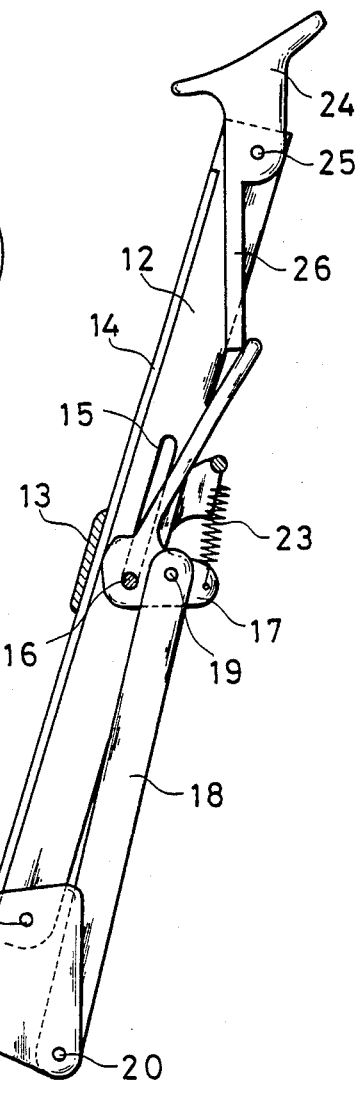
FIG. 6 is a view showing the state established when the friction member has been turned to its second position.

When it is desired to change the angle of inclination of the backrest support member 12, the following operation will be performed. First, the lever 24 is manually operated, turning the friction member 17 until it reaches the second position. This state is shown in FIG. 6. As shown, when the friction member 17 is in the second position shown in FIG. 6, the short radius section 22 of the friction member 17 (FIG. 4) is opposed to the projecting wall of the backrest support member 17 with some clearance defined therebetween. Therefore, the friction between the friction member 17 and the projecting wall 14 disappears, with the result that the friction member 17 together with the pin 16 is allowed to move along the elongated opening 15.

In this manner, with the friction member 17 maintained in the second position, the backrest support member 12 is tilted until a desired angle of inclination is obtained. Then, the hand is removed from the lever 24, whereupon the friction member 17 is turned back to the first position by the action of the spring 23, so that the inclined state of the backrest support member 12 is fixed. FIG. 7 shows the angel of inclination of the backrest support member 12 being at a maximum.

In addition, when it is desired to turn the backrest support member 12 from a greater to a smaller angle of inclination, there is no need to operate the lever 24, because referring to FIG. 7, raising the backrest support member 12 removes the force of the prop rod 18 from the friction member 17. Therefore, even if the user does not touch the lever 24, it is possible to easily raise the backrest support member 12 while supporting the backrest support member 12. When a desired angle of inclination is attained, the hold on the backrest support member 12 is released, whereupon a frictional force is produced between the friction member 17 and the projecting wall 14 by the action of the prop rod 18, so that the angle of inclination thus attained is firmly fixed. It will be understood from the above description that the turning operating means for operating the friction member 17 for turning movement is required only when it is desired to tilt the backrest support member rearwardly.

Thus, according to this invention, the backrest support member 12 can be fixed at any desired angle of inclination, being very convenient for use. In addition, in the above embodiment, the lever 24 has been used as the rotating or turning means for operating the friction member 17. However, it is possible to turn the friction member 17 without using the lever 24. For example, it is possible to turn the friction member 17 by operating the upward extension 27 of the friction member 17. In that case, the upward extension 27 would serve as turning operating means. Other various forms of turning operating means may be contemplated.

Further, the slide member 13 and the spring 23 used in the above embodiment are not essential components. Even without them, the object of the invention can fully be attained. However, the provision of the spring 23 and slide member 13 affords the merit of ensuring that the backrest member 17 turns back to the first position more positively and easily.

In the above embodiment, the backrest inclination angle adjusting mechanism installed on one side of the baby carriage has been illustrated. However, to support the backrest portion in a stabilized manner, it is desirable to provide the same mechanism also on the other side of the baby carriage.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A baby carriage backrest inclination angle adjusting mechanism, comprising a backrest support member turnably connected at its lower end to a baby carriage body, a pin, a friction member attached to said backrest support member by said pin for permitting a turning movement of said friction member between a first and a second position, operating means arranged for turning said friction member between said first and second positions, a prop member for supporting said backrest member from behind, first means turnably connecting said prop member at its upper end to said friction member, second means turnably connecting said prop member at its lower end to said baby carriage body, said backrest support member having a first lengthwise wall portion and a second lengthwise wall portion projecting away from said first wall portion, an elongated opening located in said first wall portion rearwardly of and extending in parallel to said second wall portion, said pin extending through said elongated opening, whereby said pin is movable in and along said elongated opening, said friction member having a zone facing a surface of said second wall portion, said zone having a long radius section located at a relatively long distance from said pin and a short radius section extending downwardly from said long radius section and located at a relatively short distance from said pin, the arrangement being such that when said friction member is in said first position, said long radius section abuts against said surface of said second wall portion and when said friction member is in the second position, said short radius section is opposed to said second wall portion with some clearance defined therebetween.

2. The baby carriage backrest inclination angle adjusting mechanism of claim 1, wherein said operating means for turning said friction member comprises a lever engaging said friction member and means turnably connecting said lever to said backrest support member.

3. The baby carriage backrest inclination angle adjusting mechanism of claim 1, further comprising a slide member disposed on said backrest support member, means fixing said slide member to said pin, whereby said slide member is slidable together with said pin, and spring means connecting said friction member to said slide member, said spring means constantly urging said friction member to turn back to the first position.

* * * * *